S. A. ROGERS.
CABLE OR MONORAIL TRAMWAY AND VEHICLES FOR THE SAME.
APPLICATION FILED NOV. 17, 1917.
1,342,926.
Patented June 8, 1920.
4 SHEETS—SHEET 3.
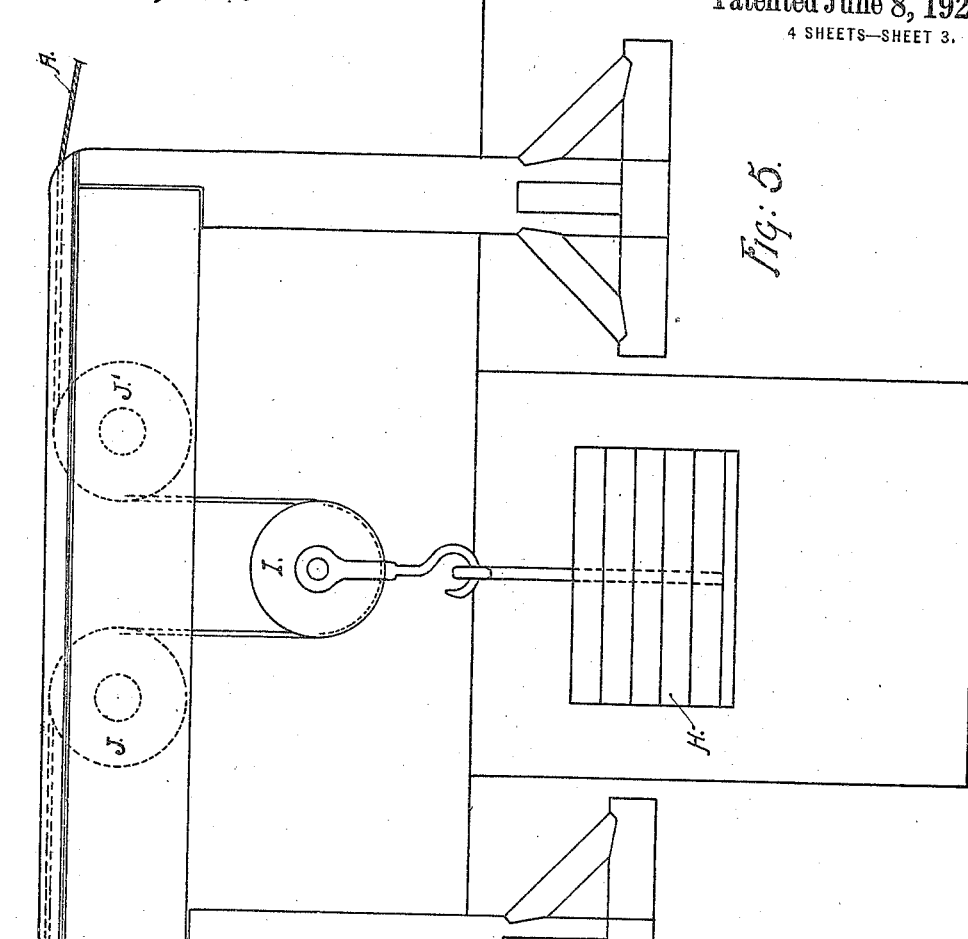
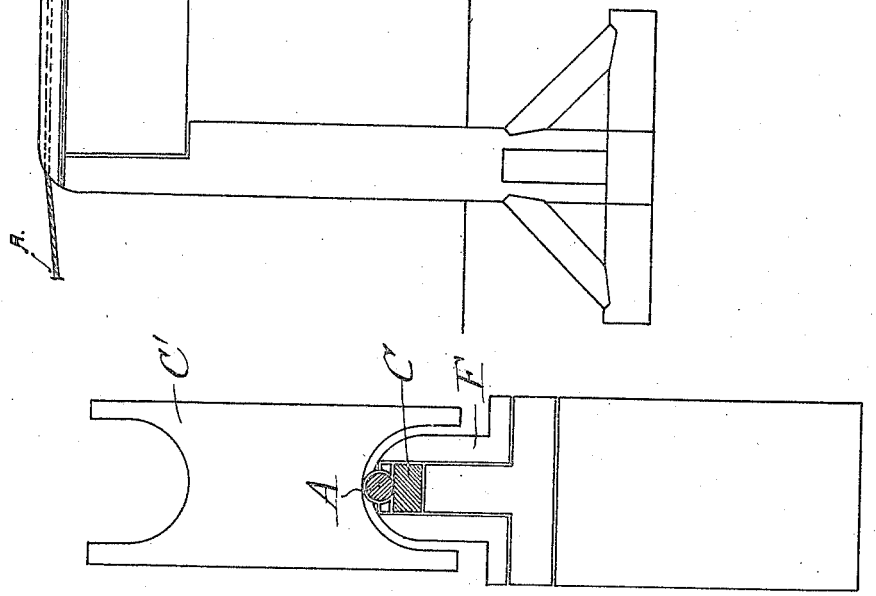

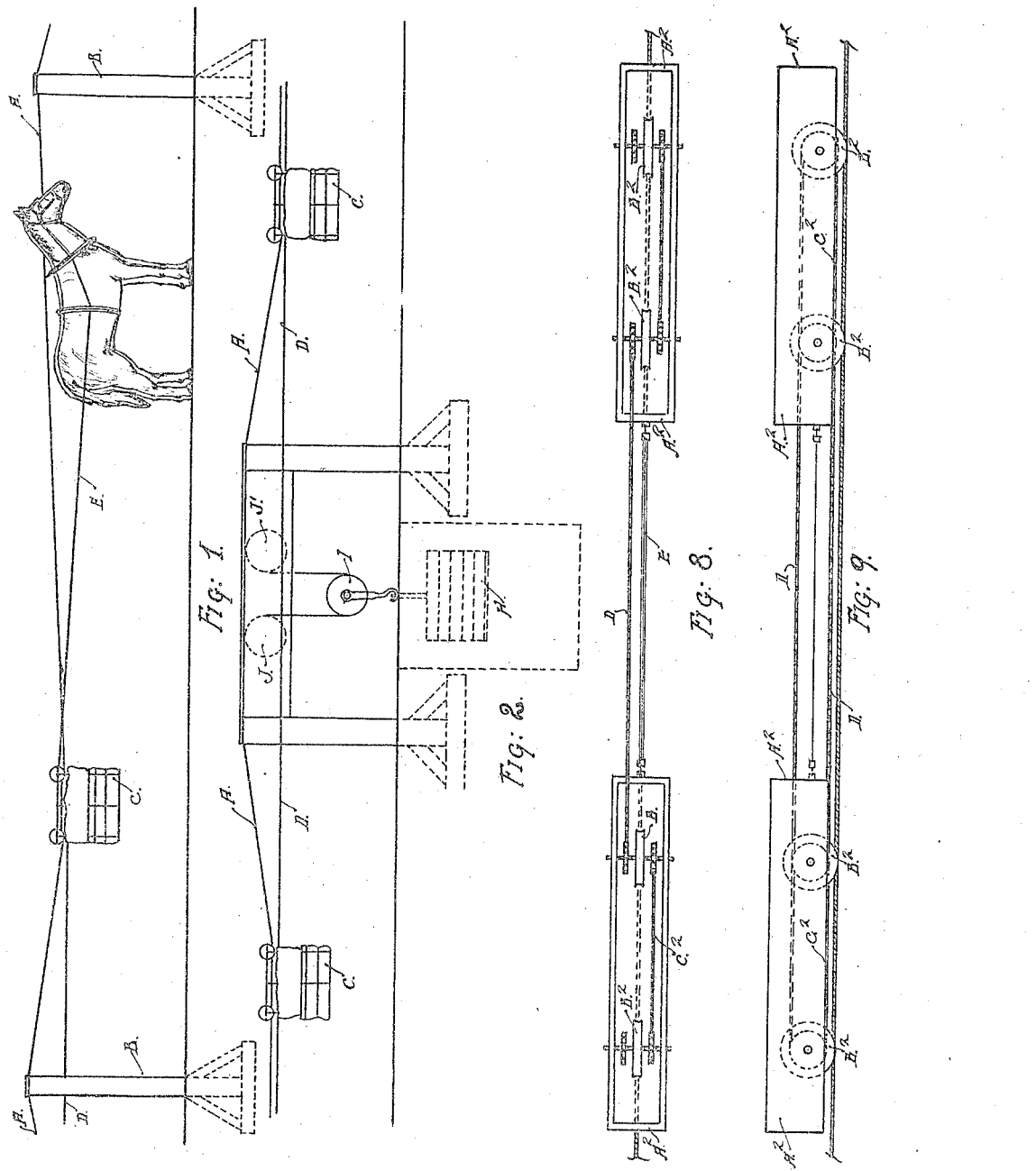

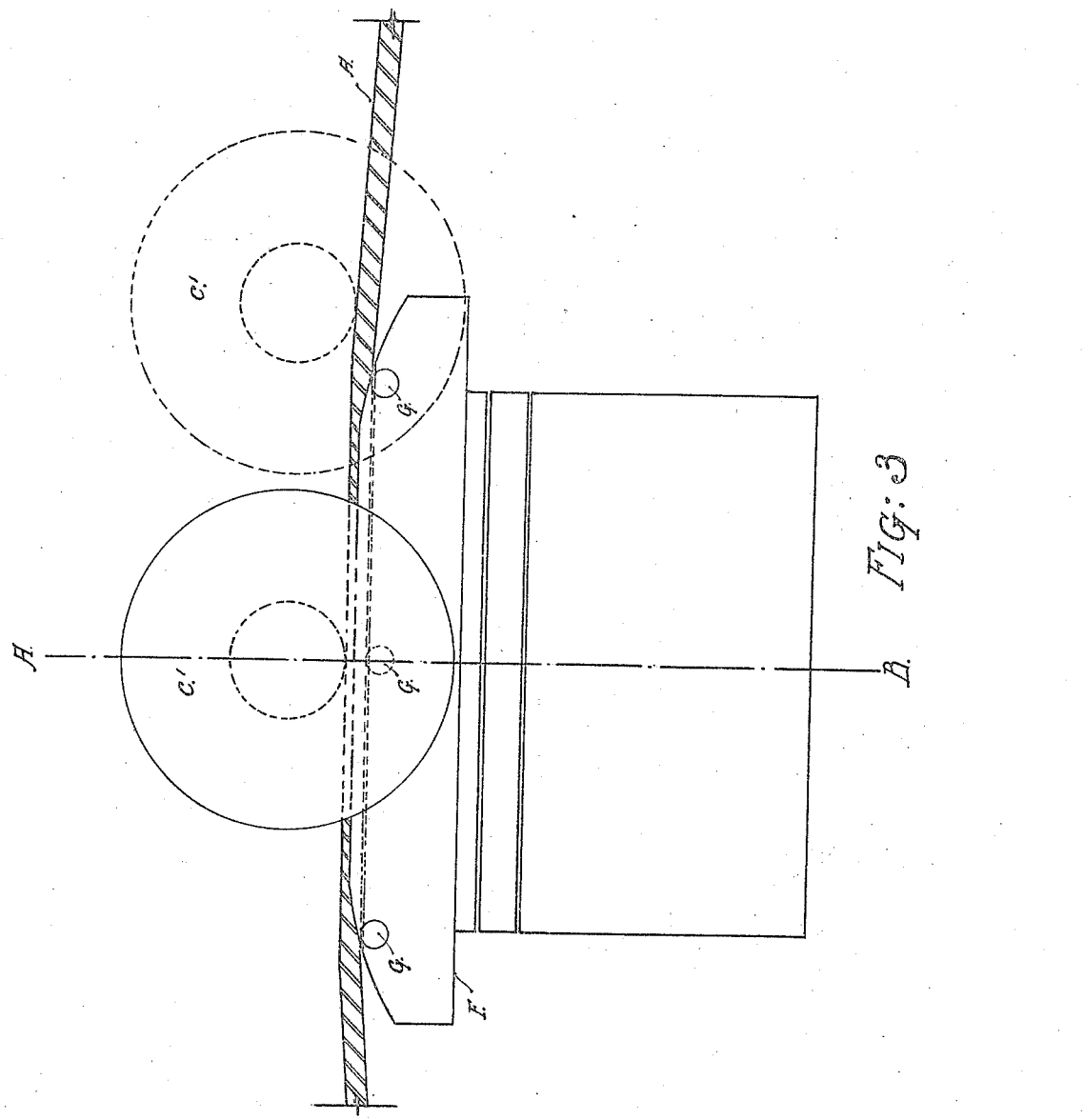

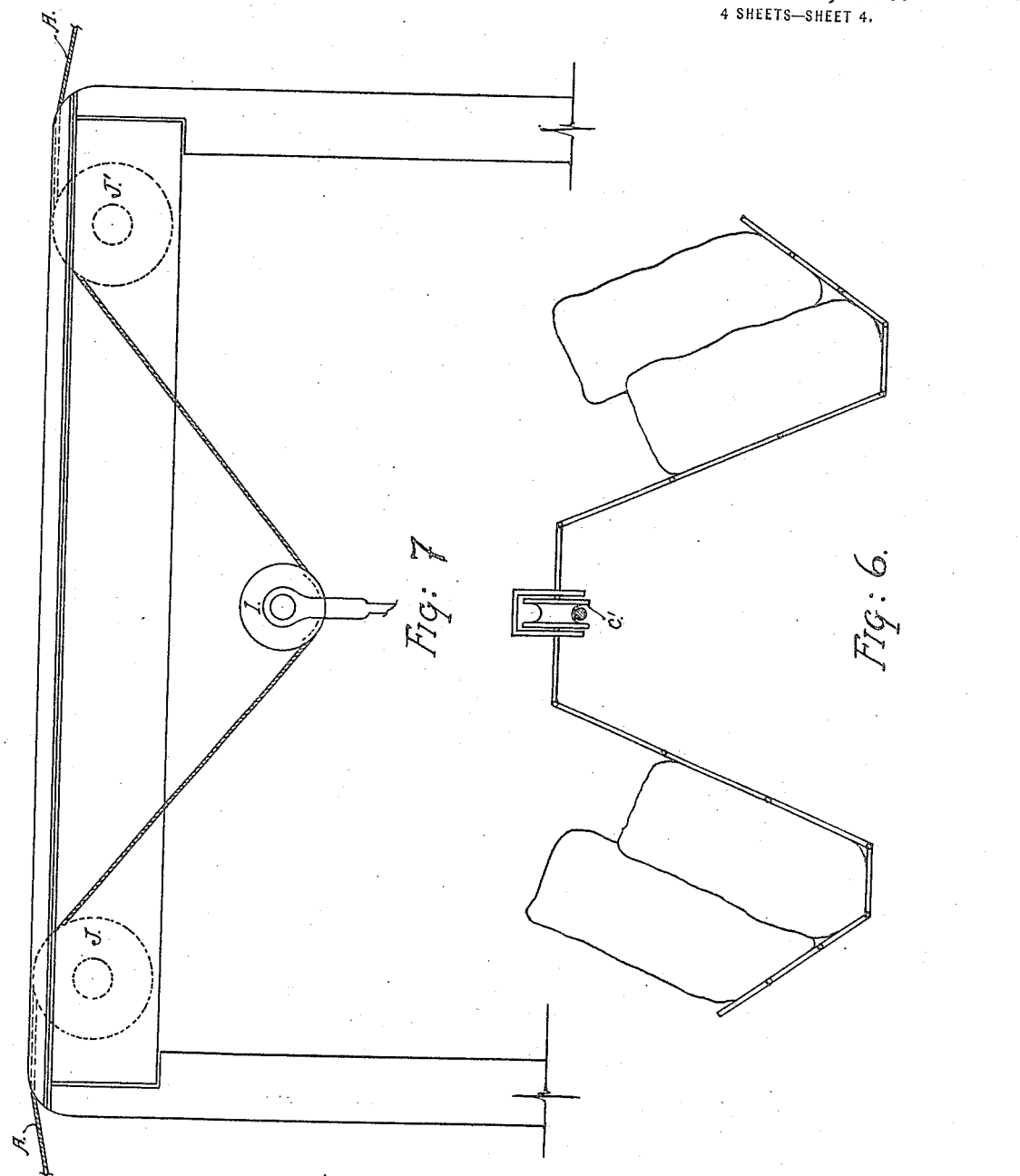

UNITED STATES PATENT OFFICE.

STEWART ALEXANDER ROGERS, OF BUENOS AIRES, ARGENTINA.

CABLE OR MONORAIL TRAMWAY AND VEHICLES FOR THE SAME.

1,342,926.       Specification of Letters Patent.       Patented June 8, 1920.

Application filed November 17, 1917. Serial No. 202,469.

*To all whom it may concern:*

Be it known that I, STEWART ALEXANDER ROGERS, a subject of Great Britain, and resident of Buenos Aires, in Argentina, have invented certain new and useful Improvements in Cable or Monorail Tramways and Vehicles for the Same, of which the following is a specification.

This invention relates to light wire or monorail tramways and the vehicles adapted to the same, and has for its object certain improvements in the construction of such means of transport, both as regards the line itself and the vehicles running over it, tending to cheapen the construction and operation of same, especially in rural districts.

One of the objects of the invention is to provide means of tension for the cable. Another object of the invention is to provide an improved method of transmission of motive power from one vehicle to another.

Other objects of the invention consist in certain details of construction and combination of parts which will be set forth in the following specification.

In the accompanying drawings:

Figures 1 and 2 are fragmentary views of a system embodying my invention;

Fig. 3 is a detail of the supporting mechanism of the cableway, at the top of each of the suspension poles or columns;

Fig. 4 is a sectional view taken on line A—B of Fig. 3;

Fig. 5 is a view of the special support which contains the tension device of the cable, with its corresponding counterweight and pit; and Fig. 6 is a section of one of the vehicles or wagons;

Fig. 7 shows a modified form of tension device; and

Figs. 8 and 9 represent top and side views, respectively, of a form of power transmission between the vehicles.

This system has for its basis the principle that by means of the suspension of sufficiently heavy counterweights, there may be maintained on the wire a convenient tension not only to make possible the transport by animal traction, but also to make it economical for mechanical traction as well.

In order to permit the suspension of such counterweights, in this invention I have adopted the method of placing said counterweights in pits or wells, thus placing the cableway at such a height that the vehicles may be drawn by horses or other animals.

In order to minimize as far as possible the sag of the cable caused by the weight of the wagons, another object of this invention consists in separating from each other the load units at the points which may be most convenient, and connecting them by chains or rods, in order to form a continuous train, drawn by a convenient number of horses or the like, or by a motor vehicle, under the control of one operator only, thus reducing to a minimum the cost of labor.

With reference to said drawings:

The cable or wire A is suspended on posts or columns B so as to serve as a rail for the vehicles C which are double as may be seen in Fig. 6, and run over the cable A by means of the grooved wheels C', the vehicles being connected to each other by means of chains or rods D and drawn by the chains E, as clearly shown in the drawings.

I have adopted the double or balanced vehicles in order to economize the construction of the line, as the vehicles of this type straddle over the points of the supporting poles, thus avoiding the necessity of making the latter with side arms for the suspension of the cable.

The form of construction which I have designed to facilitate the passage of the vehicle over the poles is demonstrated in Figs. 3 and 4, in which it will be seen that the cable A is supported by the rollers G, being free to move lengthwise in order to maintain a perfect equilibrium of the tensions resulting from the factors of weight and distribution of load and the weight of the tension counterweight H, which will now be described.

In Fig. 5, there is shown what may be called the principal device of this system, since in its absence it would be impossible to use the system with animal traction applied from the ground, as the possibility of maintaining the necessary counterweighted tension on a sufficiently low line for the successful use of this class of traction depends on said device.

In said device the counterweight H is suspended in a pit from a loose pulley I around which passes the cable A which to this end is supported on two fixed pulleys J and J' forming a loop in the cable between them, as will be readily understood by reference to said figure; the effect of this counterweight device, in combination with the system of free suspension of the cableway already described, is a perfect compensated distribution of the tensions of all the line or section of line, and provides that no greater tension can be imposed on the cable than that of half the weight H. But if the weight H be hung simply on an extension of the cable, and not in a loop of the same, the weight H can be divided by half. This in some instances might be the method of application, especially in the case of a line terminal.

The fact that the load is distributed in various small units separated at convenient spaces, also contributes to this effect, and the result of the described combination is that a relatively small cable will serve as a conductor, making both the installation and working very economical.

When crossing over roads a rigid rail will be used instead of the cable, and it may be arranged in the form of a swing bar or in any other convenient manner.

In certain cases it may be found desirable to make use of a modified form of tension device for the cable as is seen in Fig. 7. In the form of tension device illustrated in the first figures of the drawings, the loop of cable sustaining the counterweight is always in a vertical position whatever may be the depth at which it is suspended, the theory being that such a device provides an absolute and constant tension on the cable for any number of vehicles which may be placed on the same or be traveling simultaneously over it. By the fact of giving that vertical part of the cable a sufficient depth a constant reserve of the same is maintained which is utilized in accordance with the greater or less degree of sag produced in the line by the weight of said vehicle.

In the modified form according to Fig. 7, instead of the part of the cable sustaining the counterweight being in a vertical position it is slanted as seen in said figure, in which the cable or wire A passes over the grooved wheels J, J' placed in adequate columns and carrying the counterweight by means of another grooved wheel I, as in the formerly described device, with the only exception that the cable is suspended in an inclined position on each side, the two pulleys J and J' first mentioned being possibly more separated.

The weight being suspended in this manner, the tension on the cable will vary in inverse ratio to the depth, that is to say, that the tension will increase as the weight rises, this modified form being convenient under the following conditions: (1) when for any reason it may be convenient to substitute a greater number of these devices in place of one of the first described, since almost the same effect would thereby be produced, although not in the same degree; (2) when it may be convenient to combine the two kinds if weights in order to counteract any creeping tendency of the cable, since the weight thus suspended will always have the tendency to return to its normal level when the line is vacated, in which case the other weights which are vertically hung will necessarily adapt themselves accordingly; and (3) when in any given line, or branch for example, a single device of this modified type may be found sufficient, in place of one of the original type, for reasons of greater cheapness. Of course means for the passage of the vehicle between the pulleys J and J' must be provided, for example a bar as used in connection with the former type, or any other adequate form.

Another object of the invention is, as before stated, to provide for a distribution of the tractive effort among all the wheels of the wagons forming a train, when one of the vehicles is provided with an engine, so that the motive power produced by such vehicle may be connected to each and every one of the others in the same train, and that every wheel running over the cable or monorail may be a drive wheel, without any tension whatever, or with the minimum amount of tension, in the connections between such vehicles.

This object is accomplished, according to the invention, by means of simple sprocket wheels and chain transmission connections, (1) between the wheels of each wagon, and (2) between one wheel of each vehicle and that of the one immediately following or preceding it. I do not necessarily insist on the sprocket and chain system, but only that the rotation of every wheel shall be impressed on it by the rotation of the drive wheel or wheels.

Rigid, or more or less rigid connections between the vehicles are also provided for, not for traction purposes but rather to act as spacers to maintain the vehicles at a proper distance apart. The transmission of the motive power being from one wheel to another by means of the chain or link belt or the like, there will be no appreciable tension in the latter nor on the more or less rigid spacing connections or members between the wagons.

A specimen form of construction is shown in Figs. 8 and 9, which represent respectively top and side views of the trucks or running gear of two vehicles running adjacent to each other in a train, showing the form of transmission contemplated by this part of the invention.

In the said drawings: A² is the framework of the truck in which the drive wheels B² are mounted on shafts or journals running in suitable bearings formed in the side bars of said truck frames. The shafts carry on each side a toothed or sprocket wheel, those on one side serving to carry sprocket chains or linked belts C² which connect the two wheels of the truck, and those of the opposite side for a similar chain or belt for the power transmission from one wagon or vehicle to another.

It is evident that the devices shown in the drawings and herein described are only shown as specimens, as in practice any modifications may be made which may occur to those skilled in the art, whenever it may be necessary or convenient to change them, without departing from the scope of the invention, and I therefore claim them as a convenient form of embodiment of the invention, but not exclusively.

Having thus described my invention, what I claim and desire to secure by Letters Patent of the United States of America, is:—

In a monorail tramway, an elevated flexible cable rail, supporting rollers therefor, spaced pulleys over which the cable rail passes and between which a suspended bight of the cable rail is formed, a tensioning weight suspended from said bight, and a rigid rail in alinement with the flexible cable rail and bridging the space between the said pulleys.

Signed at Buenos Aires, Argentine Republic this 19th day of October A. D. 1917.

STEWART ALEXANDER ROGERS.

Witnesses:
H. W. HUNTINGTON,
R. PEREZ.